(12) United States Patent
Vakil et al.

(10) Patent No.: US 9,407,621 B2
(45) Date of Patent: *Aug. 2, 2016

(54) PARTICIPANT AUTHENTICATION AND AUTHORIZATION FOR JOINING A PRIVATE CONFERENCE EVENT

(71) Applicant: Microsoft Technology Licensing, LLC, Redmond, WA (US)

(72) Inventors: Mohammad Nasir Vakil, Redmond, WA (US); Anton Krantz, Kirkland, WA (US); Dhigha Sekaran, Redmond, WA (US); Vijay Kishen Hampapur Parthasarathy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/497,366

(22) Filed: Sep. 26, 2014

(65) Prior Publication Data

US 2015/0012984 A1 Jan. 8, 2015

Related U.S. Application Data

(63) Continuation of application No. 13/431,960, filed on Mar. 27, 2012, now Pat. No. 8,850,522.

(51) Int. Cl.
*G06F 7/04* (2006.01)
*G06F 15/16* (2006.01)
(Continued)

(52) U.S. Cl.
CPC ............... *H04L 63/08* (2013.01); *G06F 21/31* (2013.01); *H04L 65/403* (2013.01); *H04N 7/147* (2013.01); *H04N 7/15* (2013.01); *G06F 15/16* (2013.01); *G06F 21/00* (2013.01); *H04L 12/18* (2013.01);
(Continued)

(58) Field of Classification Search
CPC . H04L 12/18; H04L 12/1813; H04L 12/1818; H04L 12/1822; H04L 65/4038; H04L 29/06027; H04L 63/083; H04L 63/104; H04L 29/06
USPC .......................................... 715/750, 751, 753
See application file for complete search history.

(56) References Cited

U.S. PATENT DOCUMENTS 7,184,531 B2 * 2/2007 Crouch ............... H04L 12/1822
348/E7.084
7,356,697 B2 4/2008 Barnabo et al.
(Continued)

FOREIGN PATENT DOCUMENTS

EP 2204942 7/2010

OTHER PUBLICATIONS

Extended European Search Report mailed Nov. 5, 2015 for European patent application No. 13767690.4, 6 pages.
(Continued)

*Primary Examiner* — Jayesh Jhaveri
(74) *Attorney, Agent, or Firm* — Tom Wong; Micky Minhas

(57) ABSTRACT

Concepts and technologies are described herein for a mechanism by which participants who have been invited to attend a conference event can provide authentication credentials to join the conference event via a console application. When an individual attempts to join a conference event via a console application, the individual is prompted to provide his or her authentication credentials to join the conference event. The console application may inherit the individual's permissions during the conference event.

17 Claims, 4 Drawing Sheets

(51) Int. Cl.
  *G06F 17/30* (2006.01)
  *H04L 29/06* (2006.01)
  *G06F 21/31* (2013.01)
  *H04N 7/15* (2006.01)
  *H04N 7/14* (2006.01)
  *H04L 12/18* (2006.01)
  *G06F 21/00* (2013.01)

(52) U.S. Cl.
  CPC ......... *H04L 12/1813* (2013.01); *H04L 12/1818* (2013.01); *H04L 12/1822* (2013.01); *H04L 29/06* (2013.01); *H04L 63/083* (2013.01); *H04L 63/104* (2013.01); *H04L 65/4038* (2013.01)

(56) References Cited

U.S. PATENT DOCUMENTS

| | | | |
|---|---|---|---|
| 7,743,101 B2 | 6/2010 | Shaffer et al. | |
| 7,870,192 B2 | 1/2011 | Greenlee et al. | |
| 8,483,375 B2 | 7/2013 | Dhara et al. | |
| 8,576,750 B1 * | 11/2013 | Hecht | H04M 3/56 370/261 |
| 8,670,354 B2 | 3/2014 | Lohmar et al. | |
| 2002/0034164 A1 | 3/2002 | Sjoholm et al. | |
| 2004/0267938 A1 | 12/2004 | Shoroff et al. | |
| 2005/0273510 A1 * | 12/2005 | Schuh | H04L 12/1813 709/225 |
| 2006/0182249 A1 | 8/2006 | Archambault et al. | |
| 2006/0195519 A1 | 8/2006 | Slater et al. | |
| 2008/0132215 A1 | 6/2008 | Soderstrom et al. | |
| 2009/0013264 A1 * | 1/2009 | Basawapatna | G06F 3/005 715/753 |
| 2009/0210491 A1 | 8/2009 | Thakkar et al. | |
| 2010/0066805 A1 * | 3/2010 | Tucker | H04L 12/1822 348/14.08 |
| 2010/0189243 A1 | 7/2010 | Miller et al. | |
| 2010/0205664 A1 | 8/2010 | Serr et al. | |
| 2010/0318397 A1 * | 12/2010 | Singh | G06Q 10/10 705/7.18 |
| 2010/0325561 A1 | 12/2010 | Archambault et al. | |
| 2011/0033034 A1 | 2/2011 | Mani et al. | |
| 2011/0107236 A1 | 5/2011 | Sambhar | |
| 2011/0182415 A1 | 7/2011 | Jacobstein et al. | |
| 2011/0225247 A1 | 9/2011 | Anantharaman et al. | |
| 2011/0228922 A1 | 9/2011 | Dhara et al. | |
| 2011/0271332 A1 | 11/2011 | Jones et al. | |
| 2013/0191896 A1 | 7/2013 | Adderly et al. | |

OTHER PUBLICATIONS

Cisco Webex Event Center User's Guide Version 6.5, Cisco, 2010.
Cisco Webex Connect Version 6.5—Release Notes, Cisco, May 2010.
International Search Report dated Jun. 19, 2013 in International Application No. PCT/US13/029734.
"GoToMeeting Security White paper", Citrix Online, Retrieved at <<http://www.gotomeeting.com/fec/images/pdf/Global_Corporate_Services.pdf>>, Retrieved Date: Nov. 28, 2011, pp. 10.
U.S. Official Action dated Jan. 16, 2014 in U.S. Appl. No. 13/431,960.
U.S. Notice of Allowance dated May 23, 2014 in U.S. Appl. No. 13/431,960.

* cited by examiner

PARTICIPANT AUTHENTICATION AND AUTHORIZATION FOR JOINING A PRIVATE CONFERENCE EVENT

CROSS-REFERENCE TO RELATED APPLICATIONS

This application is a continuation of co-pending U.S. patent application Ser. No. 13/431,960, filed on Mar. 27, 2012, and titled "Participant Authentication and Authorization for Joining a Private Conference Event via a Conference Event Environment System," the entire contents of which are hereby incorporated by reference herein.

BACKGROUND

Web-based conferencing services allow conferencing events, such as meetings, training events, lectures, presentations, and the like, to be shared among local and remote participants. Conference events are sometimes accessible via meeting rooms equipped with systems for facilitating these conferencing services. In some instances, a meeting room is made publicly accessible or otherwise accessible to multiple individuals, such as employees of a company, without restriction. In these instances, there is a potential for someone that is not invited to a conference event to be able to join the conference event via an in-room conferencing system. Moreover, in some cases, only selected participants are allowed to present content during the conference event. The publicly accessible in-room conferencing system, however, cannot distinguish between a participant with presenter permissions, a participant without presenter permissions, and other individuals that have not been invited to the conference event. Thus, remote participants and the conference event organizer, who may or may not attend the conference event, cannot be confident that the participants in the meeting room are the participants that were invited to the conference event.

It is with respect to these and other considerations that the disclosure made herein is presented.

SUMMARY

Concepts and technologies are described herein for a mechanism by which participants who have been invited to attend a conference event and who are physically present within a conference event environment, such as a meeting room, can provide authentication credentials to join the conference event via a conference event environment system. In accordance with the concepts and technologies disclosed herein, when an individual attempts to join a conference event via the conference event environment system, the individual is prompted to provide his or her authentication credentials to join the conference event via the conference event environment system to participate in the conference event. If authenticated, the conference event environment system joins the conference event on behalf of the authenticated individual. In some embodiments, the conference event environment system inherits the individual's permissions, such as in regards to whether or not the individual has been permitted to present content during the conference event. In some embodiments, a conference event roster is used to identify the authenticated individual as having joined the conference event via the conference event environment system.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
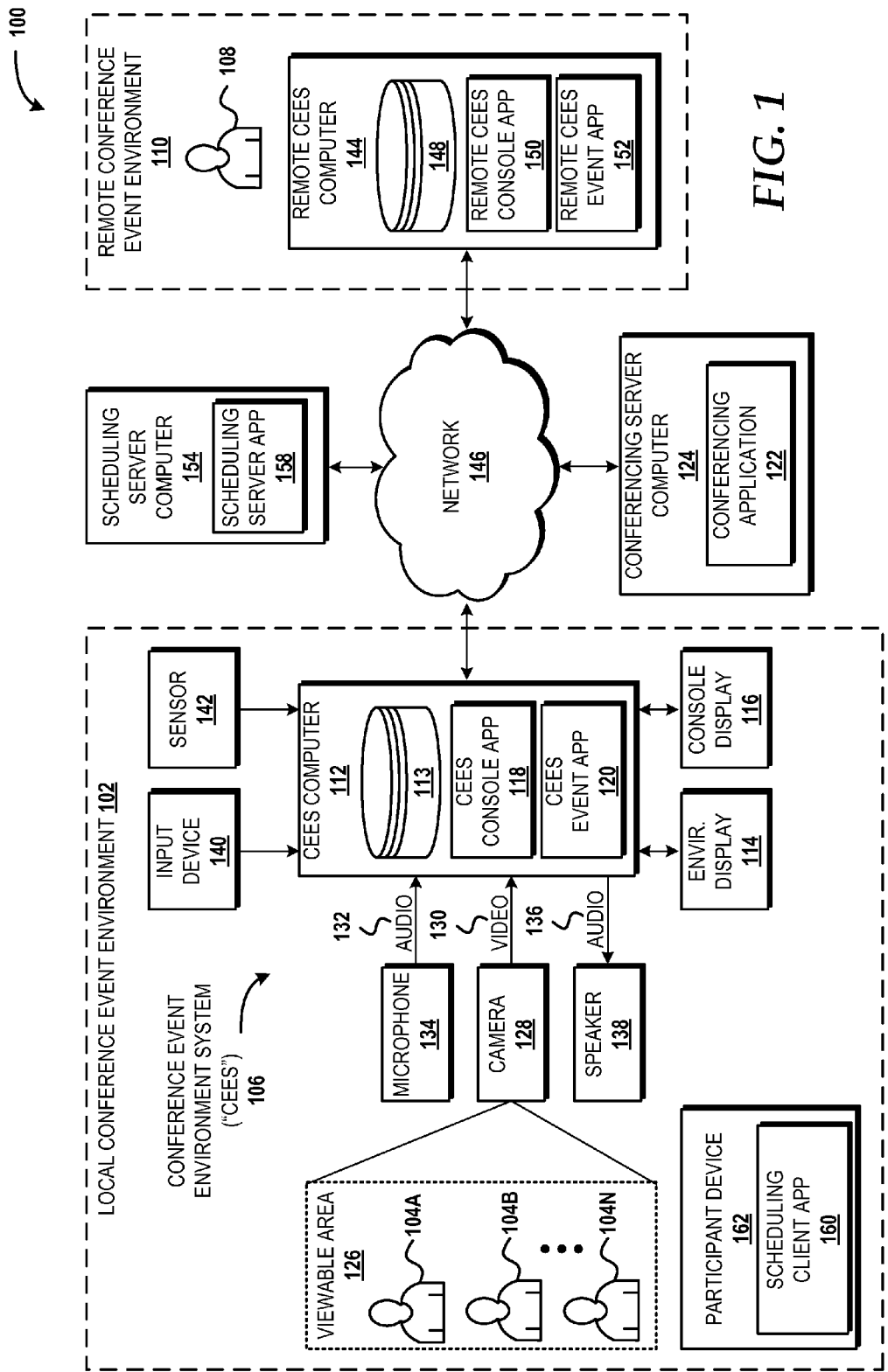
FIG. 1 is a system diagram illustrating an illustrative operating environment for the various embodiments disclosed herein.

The following detailed description is directed to concepts and technologies for a mechanism by which participants who have been invited to attend a conference event and who are physically present within a conference event environment, such as a meeting room, can provide authentication credentials to join the conference event via a conference event environment system. In accordance with the concepts and technologies disclosed herein, when an individual attempts to join a conference event via the conference event environment system, the individual is prompted to provide his or her authentication credentials to join the conference event via the conference event environment system to participate in the conference event. If authenticated, the conference event environment system joins the conference meet on behalf of the authenticated individual. In some embodiments, the conference event environment system inherits the individual's permissions, such as in regards to whether or not the individual has been permitted to present content during the conference event. In some embodiments, a conference event roster is used to identify the authenticated individual as having joined the conference event via the conference event environment system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for participant authentication and authorization for joining a private conference event via a conference event system application will be presented.

Referring now to FIG. 1, aspects of one operating environment 100 for the various embodiments presented herein will be described. The illustrated operating environment 100 includes a local conference event environment 102 in which a conference event, such as a meeting, training event, lecture presentation, or the like, is being at least in part held. The local conference event environment 102 may be any indoor or outdoor environment including, but not limited to, a temporary structure such as a tent or canopy; a permanent structure such as an office building, hotel, house, stadium, or a space or room, such as a meeting room, contained therein; a park, yard, or other outdoor venue; or some variation of the these environments. The local conference event environment 102 may include one or more local participants of the conference event. In the illustrated embodiment, the local conference event environment 102 includes local participants 104A, 104B, 104N who are attending the conference event. The local participants 104A, 104B, 104N are collectively referred to herein as the local participants 104.

In the illustrated embodiment, the local participants 104 are able to utilize a conference event environment system ("CEES") 106 to attend the conference event via a web conferencing service to communicate and otherwise collaborate with one or more remote participants. In the illustrated embodiments, a remote participant 108 is remotely attending the conference event from a remote conference event environment 110. More particularly, the local participants 104 are able to access a CEES computer 112 to admit the CEES computer 112, operating as a conference event environment endpoint, to the conference event on their behalf. For instance, a participant of a conference event, such as the local participant 104A, may walk into the local conference event environment 102 and access the CEES computer 112 to make a request to join the conference event. In response, the CEES computer 112 may prompt the local participant 104A to provide one or more authentication credentials in an effort to verify that the local participant 104A has been invited to attend the conference event. The local participant 104A may then provide his or her authentication credentials and the CEES computer 112 may allow or deny the local participant 104A access to attend the conference event based upon whether or not the authentication credentials provided by the local participant 104A are correct based upon information known to the CEES computer 112 regarding the invited participants of the conference event. This conference event information may be stored, for example, in a CEES computer data store 113. If the local participant 104A is authenticated, the CEES computer 112 joins the conference event on behalf of the local participant 104A.

The local conference event environment 102 may be any indoor or outdoor environment including, but not limited to, a temporary structure such as a tent or canopy; a permanent structure such as an office building, hotel, house, stadium, or a space or room, such as a meeting room, contained therein; a park, yard, or other outdoor venue; or some variation of the these environments. In some embodiments, the remote conference event environment 110 is any indoor or outdoor environment located outside of the local conference event environment 102. It is contemplated, however, that the remote conference event environment 110 may be contained within the local conference event environment 102. Such a case may arise, for example, when the remote participant 108 is performing testing, setup, or calibration procedures.

In some embodiments, the CEES computer 112 inherits the permissions of the local participant 104A. For instance, if the local participant 104A was invited to attend the conference event as a presenter, the CEES computer 112 would inherit presenter permissions, and would allow the CEES computer 112 to present content during the conference event on behalf of the local participant 104A. If the local participant 104A only has attendee permissions, the CEES computer 112 would inherit attendee permissions, and would not allow the CEES computer 112 to present content during the conference event on behalf of the local participant 104A. Other permissions are contemplated.

In some embodiments, the CEES computer 112 is configured present a conference event roster to the local participants 104 using a display, such as an environment display 114 and/or a console display 116, both of which are described in greater detail herein below. A conference event roster also may be sent to the remote participant 108 of the conference event. Continuing the above example, the conference event roster may identify the local participant 104A as having joined the conference event via the CEES computer 112 or, more generally, the CEES 106. In some embodiments, the identification of the local participant 104A includes a first identifier representing the CEES 106, the CEES computer 112, and/or the local conference event environment 102, and a second identifier representing the local participant 104A. In some embodiments, these identifiers are shown together to indicate to other participants of the conference event how the local participant 104A joined the conference event. For instance, the first identifier may be "Conference Room 1" to identify the local conference event environment 102, and the second identifier may be "John Doe," which, shown together, may be "Conference Room 1 (John Doe)," or some variation thereof, such as, but not limited to, John Doe@Conference Room 1. Alternatively, the first identifier may be "Conference Room 1 System" to identify the CEES 106 or, more particularly, the CEES computer 112. Still other alternatives may identify particular CEESs or CEES computers within the local conference event environment 102 when multiple of these systems/computers are present.

An identifier shown in a conference event roster is referred to herein as a display name. It should be understood that the display name of an individual that has joined a conference event via the CEES 106 may take any format that indicates the individual having joined the conference event via the CEES 106. As such, the examples of display names provided above for individuals that have joined a conference event via the CEES 106 are merely illustrative and should not be interpreted as being limiting in any way. Additional details regarding display names are described in greater detail herein below.

The environment display 114 is an output device configured to present information in a visual form. In particular, the environment display 114 may present local and/or remote conference event video feeds, conference event rosters, other conference event related information, graphical user interface ("GUI") elements, text, images, video, notifications, virtual buttons, virtual keyboards, messaging data, Internet content, device status, time, date, calendar data, preferences, map information, location information, and/or any other information that is capable of being presented in a visual form. In some embodiments, the environment display 114 is has a larger viewable area than the console display 116, and may be positioned such that it is viewable by all of the local participants 104. Multiple environment displays 114 may be used to ensure each of the local participants 104 is able to view information displayed thereon. For instance, one environment display 114 may be used to present a local video feed and another environment display 114 may be used to present a remote video feed.

In some embodiments, the environment display 114 is a liquid crystal display ("LCD") utilizing any active or passive matrix technology and any backlighting technology (if used). In some embodiments, the environmental display 114 is a plasma display. In some embodiments, the environmental display 114 is an organic light emitting diode ("OLED") display. In some embodiments, the environment display 114 utilizes a 3D technology to present 3D images to the local participants 104. Other display types are contemplated.

In some embodiments, the environment display 114 includes a touchscreen component that provides single or multi-touch input capabilities to control various operations of the environment display 114, such as audio controls, video controls, input source, and the like, and/or operations performed by the CEES computer 112. The touchscreen component is an input device configured to detect the presence and location of a touch. The touchscreen component may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen component is incorporated on top of the environment display 114 as a transparent layer to enable a user to use one or more touches to interact with objects or other information presented on the environment display 114.

In some embodiments, the touchscreen component is a single-touch touchscreen. In other embodiments, the touchscreen component is a multi-touch touchscreen. In some embodiments, the touchscreen component is configured to detect discrete touches, single touch gestures, and/or multi-touch gestures. These are collectively referred to herein as gestures for convenience. Gestures may include, but are not limited to, tap gestures, double tap gestures, tap and hold gestures, pan gestures, flick gestures, pinch and stretch gestures, and the like. A developer may create gestures that are specific to a particular application program, such as the application programs described herein below.

The console display 116 is an output device configured to present information in a visual form. In particular, the console display 116 may present local and/or remote conference event video feeds, conference event rosters, conference event environment controls, other conference event-related information, GUI elements, text, images, video, notifications, virtual buttons, virtual keyboards, messaging data, Internet content, device status, time, date, calendar data, preferences, map information, location information, and any other information that is capable of being presented in a visual form. In some embodiments, the console display 116 has a smaller viewable area than the environment display 116. The console display 116 may be positioned on a table or some other common area within the local conference event environment 102, so that it is easily accessed by the local participants 104. In some embodiments, the console display 116 is built-in to the CEES computer 112.

In some embodiments, the console display 116 is an LCD utilizing any active or passive matrix technology and any backlighting technology (if used). In some embodiments, the console display 116 is a plasma display. In some embodiments, the console display 116 is an OLED display. The console display 116 may utilize any 3D technology to present 3D images to the local participants 104. Other display types are contemplated.

In some embodiments, the console display 116 includes a touchscreen component that provides single or multi-touch input capabilities to control various operations of the console display 116, such as audio controls, video controls, input source, and the like, and/or operations performed by the CEES computer 112. The touchscreen component is an input device configured to detect the presence and location of a touch. The touchscreen component may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen component is incorporated on top of the console display 116 as a transparent layer to enable a user to use one or more touches to interact with objects or other information presented on the console display 116. The touchscreen component of the console display 116 may be configured as described above for the touchscreen component of the environment display 114.

The illustrated CEES computer 112 includes a CEES console application 118 through which one or more of the local participants 104 may control various aspects of the conference event. In some embodiments, the CEES console application 118 is configured to provide conference call controls, audio controls, and/or video controls for controlling functionality provided by the CEES 106. In some embodiments, instead of the CEES console application 118 being executed on the CEES computer 112, the CEES console application 118 is executed on one or more remote computer systems, such as in a distributing computing environment or virtual desktop configuration. In other embodiments, the CEES console application 118 is executed on the CEES computer 112 and one or more remote computer systems.

In some embodiments, the CEES console application 118 is configured to present, on the console display 116, a conference event calendar including scheduling information, such as a date, a start time, an end time, a list of invited participants, and/or a subject, for conference events scheduled to be held in the local conference event environment 102. Alternatively, the CEES console application 118 may provide similar information in other forms such as, but not limited to, a list form or a single selection form in which a single button enables a user to join a current conference event. In some embodiments, the CEES console application 118 is configured to present, on the console display 116, the conference event roster identifying one or more participants of a conference event. The conference event roster may include all scheduled participants of a conference event, or the scheduled participants that are scheduled to participate in the conference event within the local conference event environment 102. The conference event roster may additionally or alternatively be displayed on the environment display 114.

The illustrated CEES computer 112 also includes a CEES event application 120. The CEES event application 120 is a communications application that enables the CEES computer 112 to connect to a conferencing service provided at least in part by a conferencing application 122 that is executing on a conferencing server computer 124. The conferencing service may enable the sharing of audio, video, text, instant messages, presentation content, presence information, combinations thereof, and the like among the local participants 104 and the remote participant 108. In some embodiments, the CEES event application 120 is configured to provide instant messaging, Voice over IP ("VoIP"), and/or video conferencing functionality through which the local participants 104 in a conference event can communicate with the remote participant 108 and/or other remote participants (not shown).

In some embodiments, the CEES event application 120 is a web conferencing service client software application. In some embodiments, the CEES event application 120 is MICROSOFT LYNC, available from Microsoft Corporation of Redmond, Wash. In some embodiments, the CEES event application 120 is MICROSOFT OFFICE LIVE MEETING, available from Microsoft Corporation of Redmond, Wash.

In some embodiments, the CEES event application 120 facilitates remote desktop functionality so that one or more of the local participants 104 can remotely access their own computer, a work computer, and/or a computer associated with the remote participant 108 during the conference event.

In the illustrated embodiment, the local participants 104 are located within a viewable area 126 of a camera 128. The camera 128 is configured to capture video 130 of the local participants 104 at least during a conference event and to provide the captured video 130 to the CEES computer 112. The camera 128, in some embodiments, is a digital pan tilt zoom ("PTZ") camera, a manual PTZ camera, a panoramic camera, a two-dimensional camera, a three-dimensional camera, an infrared camera, a combination thereof, or the like. In some embodiments, the camera 128 is a MICROSOFT KINECT device, available from Microsoft Corporation of Redmond, Wash. In some embodiments, the camera 128 is a POLYCOM CX5000, available from Polycom of Pleasanton, Calif.

The camera 128, in some embodiments, includes a wide angle lens such that the viewable area 126 observed by the camera 128 is of sufficient width to capture video of at least the heads of the local participants 104 simultaneously. It should be understood, however, that the camera 128 may have a lens that provides a viewable area less than sufficient width to contain at least the heads the local participants 104 simultaneously. In this case, the camera 128 may be manually or automatically (e.g., via a motor attached to the camera 128) moved so as to capture video of the local participants 104 in multiple viewable areas (not shown). Moreover, the camera 128 or a portion thereof (e.g., a lens) may be appropriately selected based upon the dimensions of the local conference event environment 102 or a focal point thereof. A focal point may be, for example, a presentation area such as a stage, a podium, or a table around which the local participants 104 are positioned within the local conference event environment 102.

Audio 132 produced by the local participants 104 during a conference event may be captured by a microphone 134. The microphone 134 may be a stand-alone microphone. Alternatively, the microphone 134 may be built-in to another component of the CEES 106, such as, but not limited to, the camera 128, the environment display 114, the console display 116, or the CEES computer 112. The microphone 134 may utilize any polar pattern suited to capture audio 132 within the local conference event environment 102. In some embodiments, the microphone 134 is a noise-canceling microphone configured to filter out at least some ambient noise in the local conference event environment 102. The microphone 134 is configured to provide the captured audio 132 to the CEES computer 112.

Audio 136, such as audio received by the CEES computer 112 from the remote participant 108, may be sent by the CEES computer 112 to a speaker 138 for playback to the local participants 104. The speaker 138 may be a stand-alone speaker. Alternatively, the speaker 138 may be built-in to another component of the CEES 106, such as, but not limited to, the camera 128, the environment display 114, the console display 116, or the CEES computer 112.

The camera 128, the microphone 134, the speaker 138, the environment display 114, the console display 116, and any audio/video sources including the CEES computer 112 of the CEES 106 are referred to herein as media end points.

The illustrated CEES computer 112 is also in communication with an input device 140, such as a keyboard, keypad, mouse, touch or multi-touch screen, touch pad, trackball, joystick, gaming pad, microphone, a combination thereof, or the like. The input device 140 is configured to facilitate input to the CEES computer 112 to control various operations of the CEES console application 118, the CEES event application 120, or both. In some embodiments, the input device 140 is a touchscreen component, such as described above, that is integrated within the console display 116 so that the local participants 104 can interact with the CEES console application 118 with touch-based controls via the console display 116. It is contemplated that the camera 128, the microphone 134, the input device 140, or some combination thereof may function, in part, as an input device through which voice controls and/or full or partial body gestures can facilitate interaction with the CEES console application 118 and/or the CES event application 120. It is also contemplated that the CEES console application 118 may be configured to learn new voice controls and/or gestures, and may be configured to map these new control and/or gestures to various inputs for the CEES computer 112.

The illustrated CEES computer 112 is also in communication with one or more sensors 142. The sensor(s) 142 may be light sensors, occupancy sensors, or other sensors, such as sensors configured to wake-up the CEES computer 112, the environment display 114, the console display 116, the camera 128, the microphone 134, the speaker 138, and/or control other equipment such as lights within the local conference event environment 102. The sensor(s) 142, lights, blinds/shades, and other non-media related components of the CEES 106 are referred to herein as non-media end points.

A conference event may have an event facilitator (not shown), who may be one of the local participants 104 or another individual or machine (e.g., a robot or a computer) responsible for operating the CEES computer 112 and/or other media end points within the CEES 106. In some embodiments, the facilitator is a host of the conference event, an organizer of the conference event, a participant of the conference event, a speaker or presenter at the conference event, a representative of the conference event, a member of an organization holding the conference event, an employee of a company holding the conference event, a sponsor of the conference event, an individual associated with a sponsor of the conference event, or the like. It is also contemplated that there may be no event facilitator or multiple event facilitators.

The CEES computer 112 is in communication with the conferencing server computer 124 and a remote CEES computer 122 via a network 146. The network 146 may be, for example, an internet, the Internet, an intranet, or an extranet.

The network 146 may be or may be accessed by another network that is a wireless wide area network ("WWAN"), such as a mobile telecommunications network utilizing one or more mobile telecommunications technologies to provide voice and/or data services. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 146 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 146 may be configured to provide voice and/or data communications with any combination of the above technologies. The network 146 may be configured to or adapted to provide voice and/or data communications in accordance with future generation technologies.

The network 146 may be or may be accessed by another network that is a wireless local area network ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot.

In the illustrated embodiment, the remote CEES computer 144 is operated by the remote participant 108 who is remotely accessing the conference event being held within the local conference event environment 102 from within the remote conference event environment 110. The illustrated remote CEES computer 144 includes a remote CEES data store 148, a remote CEES console application 150, and a remote CEES client application 152, each of which may be configured like the similarly named components of the CEES 106 for the local conference event environment 102 described herein above. Although the remote conference event environment 110 is illustrated as not having various media end points, for example, cameras, displays, speakers, and the like, such media end points are contemplated. Moreover, although the remote conference event environment 110 is illustrated as having the remote CEES computer 144, the remote conference event environment 110 may alternatively have a participant device, such as, but not limited to, a desktop computer, a portable computer (e.g., a laptop, a notebook, an ultra-portable, or a netbook), a server computer, a mobile telephone, a tablet device, a slate device, a portable video game device, or a smartphone, via which the remote participant 108 can participate in the conference event.

The conferencing server computer 124 enables data collaboration among multiple participants, such as the local participants and the remote participant 108. In the illustrated embodiment, the conferencing server computer 124 enables the CEES computer 112 to send audio and video for a conference event to the remote CEES computer 144 via the conferencing application 122, and also enables the remote CEES computer 144 to send audio and video for the conference event to the CEES computer 112. In addition to exchanging audio and video, data collaboration may include, but is not limited to, instant messaging, application sharing, white boarding, chat, polling, question and answer, Web sharing, remote desktop, other multimedia content, file transfer, and presentation software support. It should be understood that data collaboration, video or otherwise, may be uni- or bi-directional.

The conferencing application 122 may be a server software application for any web conferencing service, for example, MICROSOFT LYNC or MICROSOFT OFFICE LIVE MEETING, both of which are available from Microsoft of Redmond, Wash. The CEES event application 120 and the remote CEES event application 152 may be client-side software applications configured to communicate with the conferencing application 122 to establish, maintain, and tear down a conference session over which audio, video, and/or other content can be shared during a conference event.

The network 146 is also in communication with a scheduling server computer 154. The illustrated scheduling server computer 154 includes a scheduling server application 158 configured to receive conference event information for a conference event and send the conference event information to one or more participants (e.g., via email) who are indicated in the conference event information as having been invited to the conference event. In addition to the participants, the conference event information may identify any conference event environment systems, such as the CEES 106, which are authorized to be utilized by one or more participants during the conference event. The scheduling server application 158 is also configured to send conference event information to the CEES 106 and, more particularly, the CEES console application 118 operating on the CEES computer 112, to notify the CEES console application 118 of the upcoming conference event. In some embodiments, the scheduling server application 158 is configured to send the conference event information to the CEES computer 112 in response to a request received from the CEES computer 112 for conference event information. In some embodiments, the CEES computer 112 is configured to periodically check for new conference event information. In other embodiments, the scheduling server application 158 pushes the conference event information to the CEES computer 112 when the conference event information becomes available or at a time thereafter. The CEES computer 112 is configured to store conference event information in the CEES data store 113. In some embodiments, the scheduling server application 158 is a modified version of MICROSOFT EXCHANGE SERVER, available from Microsoft Corporation of Redmond, Wash., or another application that is configured to provide the aforementioned functionality. The scheduling server computer 154 may also operate as an email server computer.

In some embodiments, a conference event is scheduled using a scheduling client application 160 operating on a participant device 162. In some embodiments, the scheduling client application 160 is a scheduling software application. In some embodiments, the scheduling client application 160 is an email client application that includes scheduling functionality. In some embodiments, the scheduling client application 160 is a calendaring software application. In some embodiments, the scheduling client application 160 is MICROSOFT OUTLOOK, available from Microsoft Corporation of Redmond, Wash. In some embodiments, the scheduling client application 160 is a web browser application through which the participant device 162 can access a web-based version of any of the above-described embodiments of the scheduling client application 160.

The scheduling client application 160 is configured to provide a user interface through which a conference event organizer, who may be one of the local participants 104, the remote participant 108, or another individual who is not going to participate in the conference event, can schedule a conference event by providing conference event information. For instance, using the user interface, the organizer can identify one or more participants to which to send an invitation for the conference event, a subject of the conference event, a location of the conference event (e.g., the local conference event environment 102), a start time, an end time, and a description of the conference event. Moreover, the organizer can establish permissions for one or more of the participants including, for example, whether the one or more participants are permitted to present content during the conference event. Default permissions may be established for instances in which the organizer elects not to designate permissions.

In some embodiments, when a conference event is created, the organizer is provided options to customize conference event access and/or conference event presenters. Conference event access options can include, for example, organizer only, invited individuals within the same company, invited individuals within the same department within the same company, invited individuals within the same group within the same company, or individuals within the same company. Conference event presenter options can include, for example, organizer only, individuals within the same company, or no restrictions (i.e., everyone). In some embodiments, should the organizer choose not to customize a conference event, the conference event access and/or presenter options may be set to default options. For example, individuals within the same company may be set as the default option for both conference event access and presenter options. The customize conference event access, conference event presenter, and default options are merely illustrative and should not be construed as being limiting in any way.

The way in which a conference event is created may result in a scenario in which an individual joining the conference event is prompted to authenticate him or herself to gain access to the conference event and/or to be a presenter in the conference event. A non-customized conference event and a customized conference event are now defined.

A non-customized conference event is a conference event for which an individual joining the conference event using the CEES computer 112 does not need to authenticate because the CEES computer 112 account invited to the conference event can join the conference event and become a presenter in the conference event.

A customized conference event is a conference event for which an individual joining the conference event using the CEES computer 112 needs to authenticate because the CEES computer 112 account invited to the conference event does not have privileges to join the conference event or become a presenter in the conference event. Therefore, an individual attempting to join the conference event via the CEES computer 112 must have privileges to join the conference event for the CEES computer 112 to join the conference event on behalf of the individual.

The participant device 162 may be, but is not limited to, a desktop computer, a portable computer (e.g., a laptop, a notebook, an ultra-portable, or a netbook), a server computer, a mobile telephone, a tablet device, a slate device, a portable video game device, or a smartphone, via which one or more of the local participants 104 or a conference event organizer (who may be one of the local participants 104) can schedule conference events. The participant device 162 may additionally or alternatively be used by one or more of the local participants to join a conference event from within the local conference event environment 102 or away from the local conference event environment 102. In some embodiments, one or more of the local participants 104 may join a conference event via the participant device 162 and then later join the conference even via the CEES computer 112, or vice versa. A method describing these embodiments is described herein below with reference to FIG. 3.

The participant device 162 is configured to send conference event information to the scheduling server computer 154, which, in turn, distributes the conference event information to, in some embodiments, the CEES computer 112, the remote CEES computer 144, and to each of the invited participants identified in the conference event information. The conference event information may be distributed in one or more emails, for example.

In some embodiments, the scheduling server computer 154 provides a web-based scheduling client application that is configured like the scheduling client application 160, described above. In these embodiments, an organizer can access the web-based scheduling client application to schedule conference events via a website provided by or for the scheduling server computer 154 without the need for a dedicated scheduling client application, such as the scheduling client application 160 in the illustrated embodiment.

According to various embodiments, the CEES computer 112, the conferencing server computer 124, the remote CEES computer 144, the scheduling server computer 154, and/or the participant device 162 are personal computers ("PC") such as desktop, tablet, or laptop computer systems. The CEES computer 112, the conferencing server computer 124, the remote CEES computer 144, the scheduling server computer 154, and/or the participant device 162 may include other types of computing systems including, but not limited to, server computers, handheld computers, ultraportable computers, netbook computers, embedded computer systems, personal digital assistants, mobile telephones, smart phones, tables devices, slate devices, video game devices, or other computing systems or devices. The CEES computer 112, the conferencing server computer 124, the remote CEES computer 144, the scheduling server computer 154, and/or the participant device 162 are configured to execute one or more software applications (e.g., the CEES console application 118, the CEES event application 120, the conferencing application 122, the remote CEES console application 150, the remote CEES client application 152, the scheduling server application 158, and the scheduling client application 160) to provide the functionality described herein for participant authentication and authorization for joining a private conference event.

It should be understood that some implementations of the operating environment 100 include multiple CEES computers 112, multiple environment displays 114, multiple console displays 116, multiple conferencing server computers 124, multiple cameras 128, multiple microphones 134, multiple speakers 138, multiple input devices 140, multiple sensors 142, multiple remote CEES computers 144, multiple networks 124, multiple scheduling server computers 154, multiple local conference event environments 102, multiple remote conferment event environments 110, multiple CEES console applications 118, multiple CEES event applications 120, multiple conferencing applications 122, multiple remote CEES console applications 150, multiple remote CEES event applications 152, multiple scheduling server applications 158, and/or multiple scheduling client applications 160. It should also be understood that implementations may include any number of local participants 104 and any number of remote participants 108. Thus, the illustrated embodiments should be understood to be illustrative, and should not be construed as being limiting.

It also should be understood that, in some implementations, operations described above as being performed by the CEES computer 112 or portions thereof (e.g., the CEES console application 118 or the CEES event application 120) are performed by the conferencing server computer 124 or another computer (not shown) that is in communication with the network 146. In some embodiments, the camera 128 is in communication with the conferencing server computer 124 or another computer (not shown) via the network 146 without an intermediary device or computer, such as the CEES computer 112. In some embodiments, the CEES computer 112 merely facilitates access to the conferencing server computer 124 or another computer (not shown), which is configured to perform the various operations described herein above. In these embodiments, the CEES computer 112 may include a web browser application that is configured to access one or more web pages hosted by or for the conferencing server computer 124 that perform the operations performed by the CEES console application 118, the CEES event application 120, and/or other operations described herein above. It is contemplated that the conferencing services disclosed herein may be provided for free or for a cost, such as on a pay-per-use or on a subscription basis with or without contractual agreements.

Figure 2:
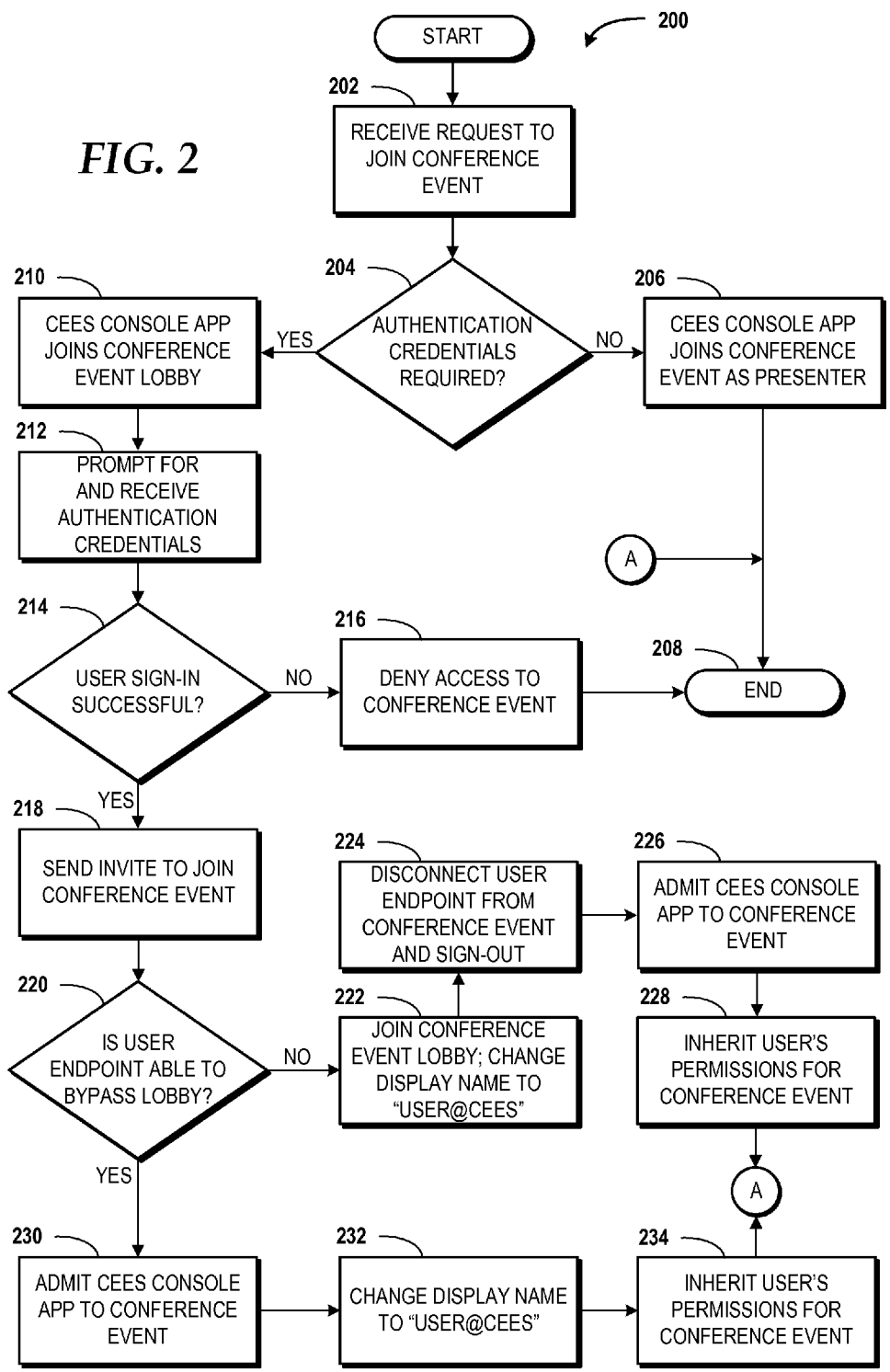
FIG. 2 is a flow diagram illustrating aspects of a method for authenticating and authorizing a user to join a conference event via a conference event environment system, according to an illustrative embodiment.

Turning now to FIG. 2, aspects of a method 200 for authenticating and authorizing a user to join a conference event will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 includes operations performed by the CEES 106 and the conferencing server computer 124. More particularly, certain operations are performed by the CEES console application 118 or the CEES event application 120 executing on the CEES computer 112, while others are performed by the conferencing application executing on the conferencing server computer 124.

The method 200 begins and proceeds to operation 202, wherein the CEES computer 112 receives a request to join a conference event via the CEES console application 118. For instance, a user may walk into the local conference event environment 102 and interact with the CEES console application 118 to join a conference event. As described above, the CEES console application 118 may present a calendar, list, or other format of scheduled conference events from which the user may select a conference event to attempt to join. In response to receiving the request to join the conference event, the method 200 proceeds to operation 204, wherein the CEES computer 112 using the CEES console application 118 determines if authentication credentials are required for the conference event. In other words, if the conference event is a customized conference event, then authentication credentials are required. As described above, the CEES computer 112 includes conference event information stored in the CEES computer data store 113, which includes an indication of whether or not the conference event is a customized conference event.

If the CEES computer 112 determines, at operation 204, that authentication credentials are not required for the conference event, the method 200 proceeds to operation 206. At operation 206, the CEES computer 112 using the CEES event application 120 communicates with the conferencing server computer 124 to request to join the non-customized conference event as a presenter. The conferencing server computer 124, in turn, joins the CEES computer 112 to the conference event as a presenter. In some embodiments, the user is provided the option through the CEES console application 118 to change the display name of the CEES computer 112 to reflect that he or she has joined the conference event via the CEES computer 112. The method 200 then proceeds to operation 208, wherein the method 200 ends.

If the CEES computer 112 determines, at operation 204, that authentication credentials are required for the conference event, the method 200 proceeds to operation 210, wherein the CEES computer 112 using the CEES event application 120 communicates with the conferencing server computer 124 to join the conference event. The conferencing server computer 124, in turn, joins the CEES computer 112 to the conference event and places the CEES computer 112 in the conference event lobby using the conferencing application 122. Alternatively, in response to receiving the request to join the conference event, the method 200 defaults to operation 210 and then makes the determination at operation 204 before proceeding to either operation 206 or operation 212.

From operation 210, the method 200 proceeds to operation 212, wherein the CEES computer 112 prompts the user for one or more authentication credentials. The prompt may be a visual prompt presented using the console display 116 and/or the environment display 114. In addition or in the alternative, the prompt may be an audio prompt presented using the speaker 138. In some embodiments, the authentication credentials include a sign-in address, such as an email address or session initiation protocol ("SIP") uniform resource identifier ("URI"), and one or more of a password, a passcode, and a personal identification number ("PIN"). It should be understood, however, that the CEES computer 112 may prompt for any type of authentication credential and any combination of authentication credentials, including authentication credentials utilized by a multi-factor authentication scheme. A multi-factor authentication scheme may use authentication credentials that fall into two or more of the following authentication categories: something one knows, something one is, something one has, and somewhere one is. Input responsive to the prompt may be received by the CEES computer 112 through the input device 140, the camera 128, and/or the microphone 134.

From operation 212, the method 200 proceeds to operation 214, wherein the CEES computer 112 determines if user sign-in is successful based upon the authentication credentials received in response to the prompt presented at operation 212. In some embodiments, the CEES computer 112 and/or a remote entity is aware of the authentication credentials required for a group of individuals, such as individuals within a company, and the conference event information identifies who among those individuals is invited to a particular conference event. In some embodiments, the CEES computer 112 makes this determination based upon expected authentication credentials stored locally, for example, as part of the conference event information stored in the CEES data store 113. In other embodiments, the CEES computer 112 communicates with a remote entity to obtain the expected authentication credentials. In still other embodiments, the CEES computer 112 sends the input to a remote entity, which, in turn, compares the input to the expected authentication credentials and returns an indication of whether or not the user is authenticated. If a user is authenticated, user sign-in is successful. If a user is not authenticated, user sign-in is not successful.

If, at operation 214, the CEES computer 112 determines that user sign-in is not successful, the method 200 proceeds to operation 216, wherein the CEES computer 112 denies the user access to the conference event. In some embodiments, the CEES console application 118 presents a notification indicating that the authentication credentials provided by the user are not valid for the conference event. In other words, a notification may be presented if the user was not invited to the conference event or the user entered incorrect authentication credentials in response to the prompt at operation 212. The notification may be presented in visual form on the console display 116 and/or the environment display 114. Alternatively or additionally, the notification may be presented in audio form via the speaker 138. In some embodiments, the CEES console application 118 returns to a home screen on the console display 116. The home screen may include a calendar, list, or other format of conference events, such as described above. From operation 216, the method 200 proceeds to operation 208, wherein the method 200 ends.

If, at operation 214, the CEES computer 112 determines that user sign-in is successful, the method 200 proceeds to operation 218, wherein the CEES computer 112 using the CEES console application 116 attempts to join a user endpoint associated with the user into the conference event to trigger a user authorization process in the conference event. More particularly, the user endpoint generates and sends a SIP INVITE to the conferencing application 122. The user endpoint is a software agent that acts on behalf of the user to join a SIP communications session for the conference event. The user authorization process determines what permissions were set by the conference event organizer for the user. As described above, the permissions may indicate that the user is an organizer, a presenter, or an invited participant. These permissions dictate how the user's user endpoint is handled by the conferencing application 122, as will now be described with reference to operation 220.

At operation 220, the conferencing application 122 determines if the user endpoint is able to bypass the conference event lobby based upon the permissions set for the user associated with the user endpoint when the conference event was created. For example, if the user has been given only attendee permissions (i.e., the user is not a presenter and is not the organizer), the conferencing application 122 may place the CEES console application 118 into the conference event lobby and wait for a presenter or organizer to admit the CEES computer 112 into the conference event. Alternatively, if the user has been given presenter or organizer permissions, the user can admit the CEES computer 112 to the conference event and bypass the conference lobby. In this example, the user can then admit other users to the conference lobby via the CEES computer 112 that only have attendee permissions.

If, at operation 220, the conferencing application 122 determines the user endpoint is not able to bypass the conference event lobby, the method 200 proceeds to operation 222, wherein the conferencing application 122 joins the user endpoint to the conference event lobby. The user endpoint then changes the display name for the CEES console application 118 to "User@CEES" or some other display name representing that the user has joined the conference event lobby via the CEES console application 118. Illustrative alternative display name formats have been described herein above. In some embodiments, the user endpoint needs the SIP dialog identifier of the SIP INVITE sent at operation 218 to change the display name for the CEES console application 118.

From operation 222, the method 200 proceeds to operation 224, wherein the user endpoint disconnects from the conference event and signs out. At operation 226, a presenter or organizer admits the CEES console app 118 to the conference event. The CEES console app 118 joins the conference event as "User@CEES." The CEES console application 118, at operation 228, inherits the user's permissions for the conference event not the presenter or organizer who admitted the CEES console application 118 at operation 226. The method 200 then proceeds to operation 208, wherein the method 200 ends.

If, at operation 220, the conferencing application 122 determines that the user endpoint is able to bypass the conference event lobby, the method 200 proceeds to operation 230, wherein the user endpoint admits the CEES console application 118 into the conference event. From operation 230, the method 200 proceeds to operation 232, wherein the user endpoint changes the display name for the CEES console application 1128 to "User@CEES" or some other display name representing that the user has joined the conference event lobby via the CEES console application 118. Illustrative alternative display name formats have been described herein above. In some embodiments, the user endpoint needs the SIP dialog identifier of the SIP INVITE sent at operation 218 to change the display name for the CEES console application 118. From operation 232, the method 200 proceeds to operation 234, wherein the CEES console application 118 inherits the user's permissions for the conference event. The method 200 then proceeds to operation 208, wherein the method 200 ends.

Figure 3:
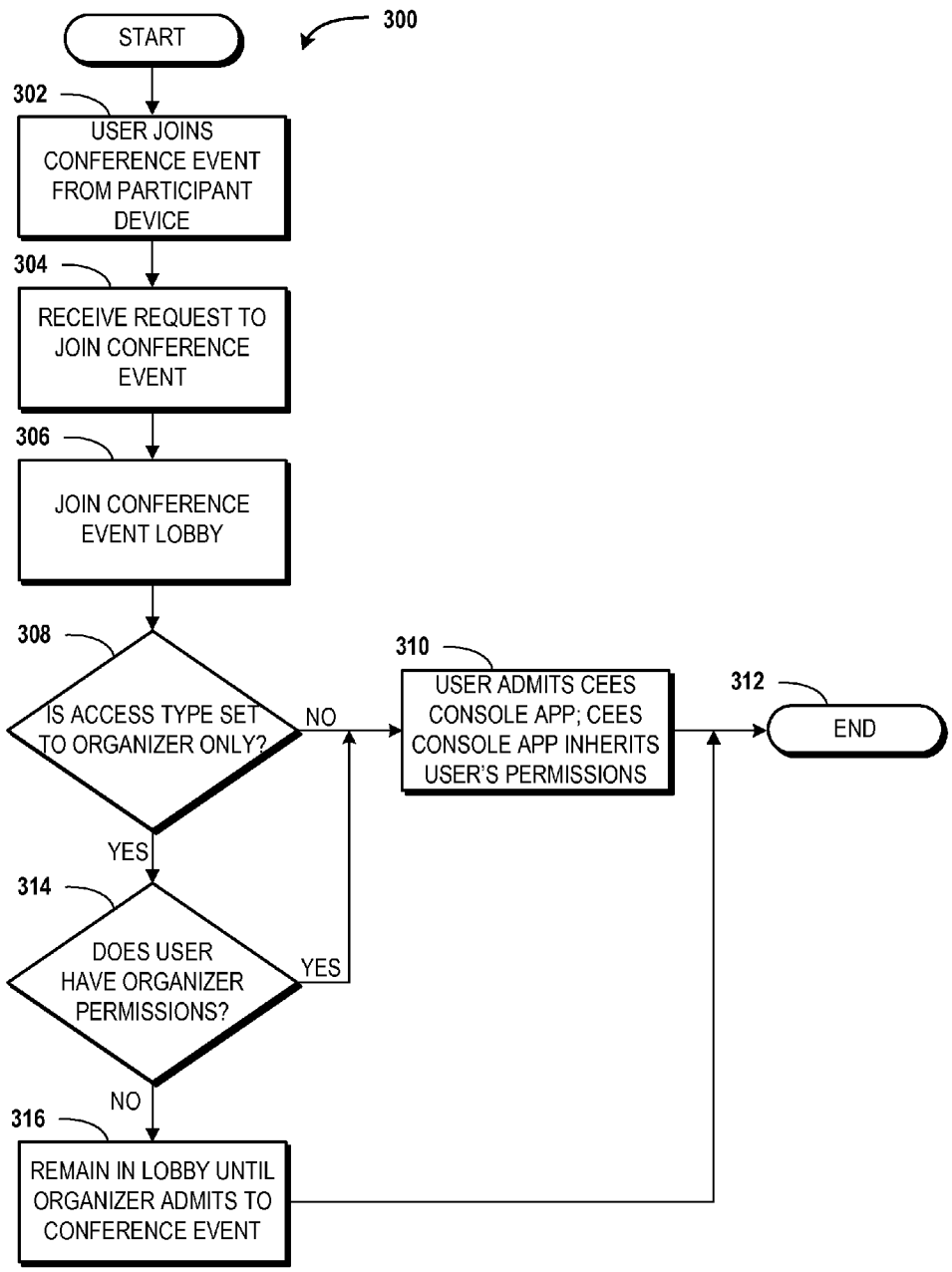
FIG. 3 is a flow diagram illustrating aspects of a method for authenticating and authorizing a user to join a conference event to which the user is already joined, according to an illustrative embodiment.

Turning now to FIG. 3, aspects of a method 300 for authenticating and authorizing a user to join a conference event to which the user is already joined will be described in detail. The method 300 begins and proceeds to operation 302, wherein the user joins the conference event from a participant device, such as the participant device 162. The method 300 then proceeds to operation 304, wherein the CEES computer 112 receives a request from the user to join the conference event via the CEES console application 118. For instance, the user may walk into the local conference event environment 102 having already joined the conference event via the participant device 162 and interact with the CEES console application 118 to join a conference event. As described above, the CEES console application 118 may present a calendar, list, or other format of scheduled conference events from which the user may select a conference event to attempt to join. The method 300 then proceeds to operation 306, wherein the conferencing application 122 joins CEES console application 118 to the conference event lobby.

From operation 306, the method 300 proceeds to operation 308, wherein the conferencing application 122 determines if the conference event access option for the conference event is set to organizer only. If, at operation 308, the conferencing application 122 determines that the conference event access option for the conference event is not set to organizer only, the method 300 proceeds to operation 310, wherein the user admits the CEES console application 118 to the conference event from the participant device 162, and the CEES console application 118 inherits the user's permissions for the conference event. The method then proceeds to operation 312, wherein the method 300 ends.

If, at operation 308, the conferencing application 122 determines that the conference event access option for the conference event is set to organizer only, the method 300 proceeds to operation 314, wherein the conferencing application 122 determines if the user has organizer permissions. If, at operation 314, the conferencing application 122 determines that the user does have organizer permissions, the method 300 proceeds to operation 310, wherein the user admits the CEES console application 118 to the conference event from the participant device 162, and the CEES console application 118 inherits the user's permissions for the conference event. The method then proceeds to operation 312, wherein the method 300 ends.

If, at operation 314, the conferencing application 122 determines that the user does not have organizer permissions, the method 300 proceeds to operation 316, wherein the CEES console application 1118 remains in the conference event lobby until an organizer admits it to the conference event. The method 300 then proceeds to operation 312, wherein the method 300 ends.

Figure 4:
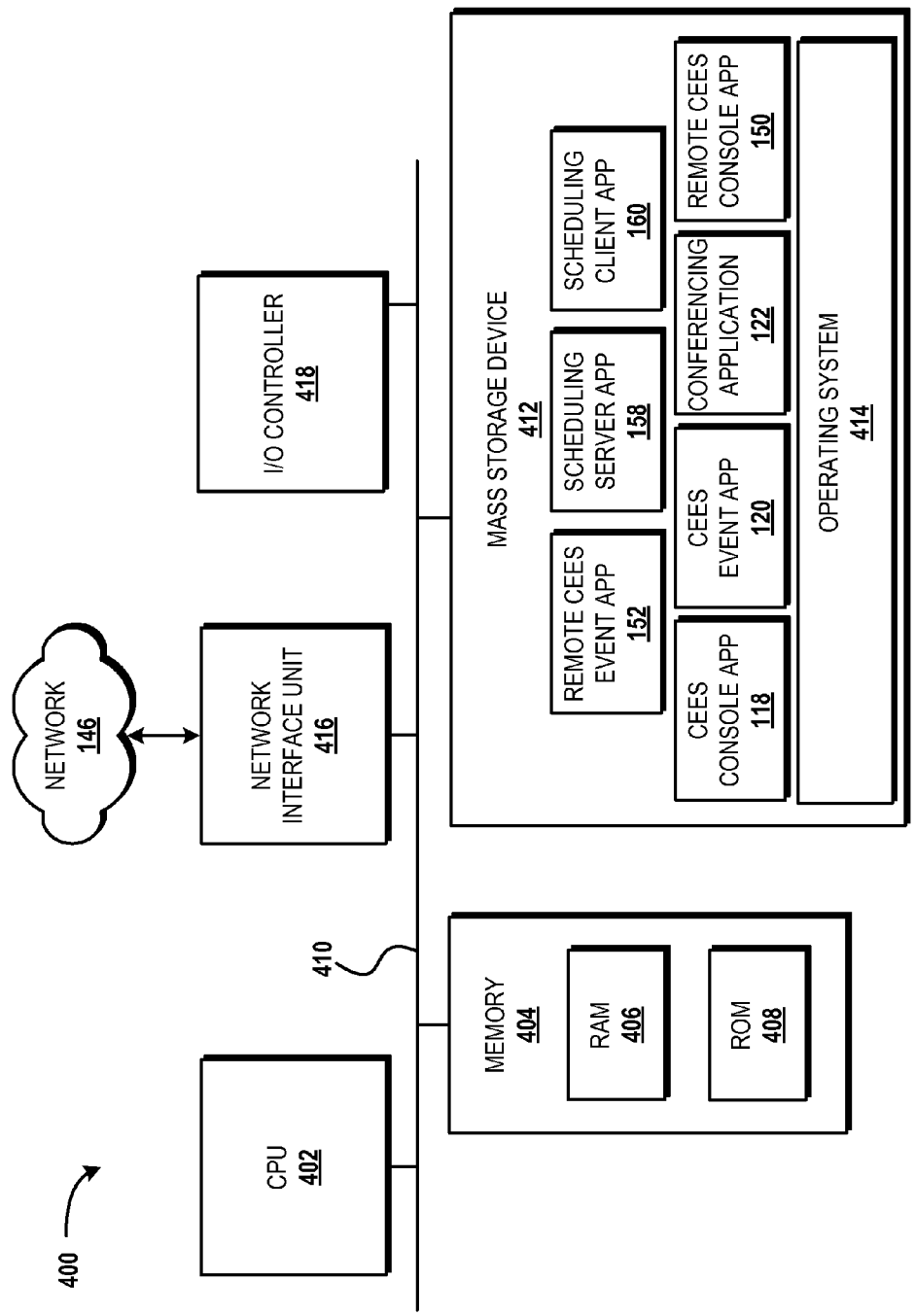
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for participant authentication and authorization for joining a private conference event via a conference event system application. The computer architecture 400 may be representative of an architecture used by the CEES computer 112, the conferencing server computer 124, the remote CEES computer 144, the scheduling server computer 154, and the participant device 162. Thus, the computer architecture 400 illustrated in FIG. 4 illustrates an illustrative architecture for a server computer, mobile phone, a PDA, a smart phone, a desktop computer, a netbook computer, a tablet computer, a laptop computer, and/or other computer systems and devices described herein. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 414, the CEES console application 118, the CEES event application 120, the conferencing application 122, the remote CEES console application 150, the remote CEES event application 152, the scheduling server application 158, and the scheduling client application 160. The operating system 414 is a computer program for controlling the operation of a computer system, such as the CEES computer 112, the conferencing server computer 124, the remote CEES computer 144, the scheduling server computer 154, or the participant device 162. The CEES console application 118, the CEES event application 120, the conferencing application 122, the remote CEES console application 150, the remote CEES event application 152, the scheduling server application 158, and the scheduling client application 160 are executable programs configured to execute on top of the operating system 414 to provide various functionality described herein.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 146. The computer architecture 400 may connect to the network 146 through a network interface unit 416 connected to the bus 410. It should be appreciated that the network interface unit 416 also may be utilized to connect to other types of networks and remote computer systems, for example, wired or wireless access networks and other computer systems located within the local conference event environment 102 or the remote conference event environment 110. The computer architecture 400 also may include an input/output controller 418 for receiving and processing input from a number of other devices, including a keyboard, mouse, electronic stylus, the input device 140, and/or the sensor 142 (all not shown in FIG. 4). Similarly, the input/output controller 418 may provide output to a display screen (e.g., the environment display 114 and/or the console display 116), a projector, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art.

It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for participant authentication and authorization for joining a private conference event via a conference event system application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for authenticating and authorizing users to join a conference event, the computer-implemented method comprising performing computer-implemented operations for:
    receiving, at a console application, a request from a user to join the conference event;
    validating authentication credentials for the user in response to the request;
    in response to validating authentication credentials for the user, determining that the user has permissions to admit the console application into the conference event;
    in response to determining that the user has permissions to admit the console application into the conference event, joining the console application to the conference event on behalf of the user; and
    in response to determining that the user does not have permissions to admit the console application into the conference event,
        waiting for a second user that has permissions to admit the console application into the conference event to admit the console application into the conference event, and
        joining the console application to the conference event on behalf of the user in response to the second user admitting the console application into the conference event,
    wherein the console application inherits the permissions of the user in response to the console application joining the conference event on behalf of the user.

2. The method of claim 1, further comprising:
    receiving, at the console application, a request from a group of users to join the conference event;
    validating authentication credentials for the group of users; and
    joining the console application to the conference event in response to the validating.

3. The method of claim 1, further comprising receiving conference event scheduling information from a scheduling application, the conference event scheduling information identifying one or more conference events that have been scheduled and that are available to be joined via the console application.

4. The method of claim 3, further comprising presenting, using the console application, the conference event scheduling information to the user, and wherein receiving the request from the user to join the conference event comprises receiving a user input of a selection of conference event scheduling information associated with the conference event.

5. The method of claim 4, wherein the conference event scheduling information associated with the conference event comprises a date, a start time, an end time, and a list of participants.

6. The method of claim 5, wherein the conference event scheduling information is represented in a calendar format, a single selection to join the conference event, or a list format.

7. The method of claim 1, wherein validating authentication credentials for the user comprises:
prompting the user to provide authentication credentials to join the conference event via the console application;
receiving a user input of authentication credentials;
determining if the authentication credentials are valid; and
in response to determining that the authentication credentials are valid, determining that the user is a participant of the conference event and joining the console application into the conference event on behalf of the user.

8. The method of claim 1, further comprising:
receiving a conference event roster identifying the user as having joined the conference event via the console application, and
presenting the conference event roster on a display.

9. A computer-implemented method for authenticating and authorizing users to join a conference event, the computer-implemented method comprising performing computer-implemented operations for:
joining a console application executing on a computer into a conference event lobby;
receiving a request from a user endpoint via the console application, the user endpoint being associated with the user;
determining if the user endpoint is able to bypass the conference event lobby and join the conference event based upon permissions established for the user for the conference event;
in response to determining that the user endpoint is able to bypass the conference event lobby,
joining the console application into the conference event,
changing a display name of the console application in the conference event to reflect that the user has joined the conference event via the console application, and
causing the console application to inherit the permissions established for the user for the conference event; and
in response to determining that the user endpoint is not able to bypass the conference event lobby,
joining the user endpoint to the conference event lobby,
joining the console application into the conference event in response to being admitted by a second user that has permissions to admit the console application into the conference event, and
causing the console application to inherit the permissions established for the user for the conference event.

10. The method of claim 9, wherein the permissions comprise conference event attendee permissions.

11. The method of claim 9, wherein the permissions comprise conference event presenter permissions or conference event organizer permissions.

12. The method of claim 9, further comprising providing a conference event roster to the console application, the conference event roster identifying, using a display name of the console application, the user as having joined the conference event via the console application.

13. The method of claim 12, wherein the computer is located within a first environment, and further comprising providing the conference event roster to a remote computer located within a second environment.

14. The method of claim 9, further comprising, prior to joining the console application into the conference event lobby, joining a participant device associated with the user into the conference event.

15. The method of claim 14, wherein, in response to determining that the user endpoint is able to bypass the conference event lobby, joining the console application into the conference event comprises, in response to determining that the user endpoint is able to bypass the conference event lobby, joining the console application into the conference event via the participant device.

16. An apparatus comprising:
a processor; and
a memory in operative communication with the processor, the memory having stored thereon executable instructions to direct the processor to:
execute a console application;
receive, at the console application, a request from a user to join a conference event;
validate authentication credentials for the user in response to the request;
in response to validating authentication credentials for the user, determining that the user has permissions to admit the console application into the conference event;
in response to determining that the user has permissions to admit the console application into the conference event, joining the console application to the conference event on behalf of the user; and
in response to determining that the user does not have permissions to admit the console application into the conference event,
waiting for a second user that has permissions to admit the console application into the conference event to admit the console application into the conference event, and
joining the console application to the conference event on behalf of the user in response to the second user admitting the console application into the conference event,
wherein the console application inherits the permissions of the user in response to the console application joining the conference event on behalf of the user.

17. The apparatus of claim 16, wherein the executable instructions further direct the processor to:
receive, at the console application, a request from a group of users to join the conference event;
validate authentication credentials for the group of users; and
join the console application to the conference event in response to the validating.

* * * * *